United States Patent [19]

Müssig et al.

[11] Patent Number: 4,820,771

[45] Date of Patent: Apr. 11, 1989

[54] HIGH IMPACT POLYAMIDES

[75] Inventors: Bernhard Müssig, Seevetal; Rolf-Volker Meyer, Krefeld; Bert Brassat, Krefeld; Rolf Dhein, Krefeld, all of Fed. Rep. of Germany

[73] Assignee: Bayer Aktiengesellschaft, Leverkusen-Bayerwerk, Fed. Rep. of Germany

[21] Appl. No.: 856,164

[22] Filed: Apr. 25, 1986

Related U.S. Application Data

[63] Continuation of Ser. No. 744,466, Jun. 13, 1985, abandoned, which is a continuation of Ser. No. 536,620, Sep. 28, 1983, abandoned.

[30] Foreign Application Priority Data

Aug. 10, 1982 [DE] Fed. Rep. of Germany ....... 3237401

[51] Int. Cl.$^4$ .............................................. C08L 77/00
[52] U.S. Cl. .................................. 525/183; 525/423; 525/425; 525/426; 525/430
[58] Field of Search ............... 525/423, 425, 113, 179, 525/183

[56] References Cited

U.S. PATENT DOCUMENTS 3,484,339 12/1969 Caldwell .............................. 525/425
4,086,295 4/1978 Mori et al. ........................... 525/184
4,100,223 7/1978 Meyer et al. ........................ 525/184
4,320,213 3/1982 Woodbrey et al. ................. 525/184
4,473,686 9/1984 Grigo et al. ......................... 525/184

FOREIGN PATENT DOCUMENTS 0037430 10/1981 European Pat. Off. .

OTHER PUBLICATIONS

"Liquid 1,2-Polybutadiene Resins NISSO-PB®", Nippon Soda Co., Ltd. (no date available).
"Encyclopedia of Chemical Technology", Kirk-Othmer, 3Ed., vol. 8, (1982), pp. 633–637.
"Polyurethane", Becker and Braun, Hunstoff-Handbuck, vol. 7, (1983), pp. 42–61.
Kirk-Othmer, "Encyclopedia of Chemical Technology", 3Ed., vol. 8, p. 447 (no date available).
Considine, D. M., "Chemical and Process Technology Encyclopedia", McGraw-Hill Book Company, p. 387 (no date available).

Primary Examiner—John C. Bleutge
Assistant Examiner—A. Carrillo
Attorney, Agent, or Firm—Connolly and Hutz

[57] ABSTRACT

Thermoplastically polyamide moulding compositions produced from at least 70% by weight of polyamide, a long-chain polyester, polyether or hydrocarbon polyol and at most 5% by weight of a polyanhydride or polyepoxide.

8 Claims, No Drawings

HIGH IMPACT POLYAMIDES

This application is a continuation of application Ser. No. 744,466 filed June 13, 1985, now abandoned, which is a continuation of application Ser. No. 536,620 filed Sept. 28, 1983, now abandoned.

This invention relates to high-impact, easy flowing polyamide moulding compositions into which a long-chain polyol and at least one polyanhydride and/or polyepoxide have been incorporated.

The impact strength of polyamide mouldings depends to a large extent on their water content. In a water-free state, for example after their production by injection moulding, mouldings produced from free-flowing and, hence, readily processible polyamide injection moulding compositions of average molecular weight, especially those produced from highly crystalline polyamides, are relatively sensitive to impact.

Although polyamides of relatively high molecular weight, of the type preferably used for extrusion, give mouldings that are less sensitive to impact, they are more difficult to process on account of their greatly increased melt viscosity and their resulting, poorer flow.

Furthermore, the production of polyamides of relatively high viscosity frequently requires expensive and complicated post-condensation in the solid phase.

Accordingly, there is a need for easily processible, easy-flowing polyamide moulding compositions from which it is possible to produce mouldings showing increased impact strength in their dry state. Of particular interest are polyamides having besides a high tensile strength and ready processibility a high impact strength and flexability.

According to various known processes for increasing the toughness and flexibility of polyamides for instance low molecular weight plasticizers are mixed into polyamides. Unfortunately, this does not solve the problem satisfactorily for several reasons. Most of the plasticizers suitable for plastics are inadequately compatible with polyamides and they either separate during processing or show a tendency towards exudation. However, compatible plasticizers which form genuine solutions with polyamides generally have an adverse effect upon their favourable mechanical properties. Although high polar substanaces of low molecular weight, such as water or dimethyl formamide, improve toughness, they can only be incorporated in polyamide mouldings after their production because otherwise bubble-containing mouldings would be formed in the processing. As a result, this process is generally too timeconsuming and expensive and unsuitable for the production of thickwalled mouldings on account of the irregular distribution of the additives.

According to other processes, the impact strength of polyamides is improved by the incorporation of certain polymeric substances. Thus, polyethylenes and copolymers of vinyl acetate and ethylene have been used with moderate success.

Better results are obtainable, for example, by incorporating olefinic copolymers containing $CO_2H$-groups or their corresponding graft polymers into polyamides.

The same also applies to modification with rubber polymers, for example with grafted acrylic or polybutadiene rubber particles or soft blocks which are incorporated into the polyamide by polycondensation. But the degree of toughness thus achieved is inadequate for some applications.

Several attempts by branching or crosslinking have been made for producing relatively high molecular weight polyamides without the need for postcondensation in the solid phase.

In principle, polyfunctional epoxides and, in particular, polyfunctional isocyanates, for example, are suitable for that purpose.

These processes do in fact give products of relatively high toughness. However, the melt viscosity of the products is also increased to such an extent that the products are very difficult to process by injection-moulding.

It has now surprisingly been found that high-impact free-flowing polyamide moulding compositions which do not have any of the disadvantages mentioned above can be obtained by modifying polyamides with long-chain polyols and either polyanhydrides or polyepoxides. The mouldings produced therefrom show distinctly improved toughness which, in the case of mouldings of unmodified polyamides, is only observed where polyamides of considerably higher molecular weight are used. However, the production of these mouldings is complicated by the poorer flow properties of the high molecular weight polyamide.

Accordingly, the present invention provides easily flowable thermoplastic polyamide moulding compositions produced from 1. 70 to 98.95 % by weight, preferably from 85 to 97.9% by weight and, more preferably, from 92 to 96.9% by weight of a thermoplastic polyamide;

2. 1 to 30% by weight, preferably from 2 to 15% by weight and, more preferably, from 3 to 8% by weight of at least one long-chain polyol based on polyesters, polyethers or hydrocarbons having a number average molecular weight Mn of from 500 to 20,000 preferably from 1000 to 5000 and, more preferably, from 1500 to 2500, a softening point of $\leq 100°$ C. and a functionality of from 1 to 4, preferably 2; and 3. 0.05 to 5% by weight and preferably from 0.1 to 3% by weight of at least one polyanhydride and/or polyepoxide, preferably a polyanhydride having a functionality of at least 5, the sum total of components 1 to 3 always being 100% by weight.

Suitable hydrocarbon-based polyols include the so-called telechelics, for example polybutadiene and isoprene polyols, particularly in hydrogenated form. Commercially available products of this type are Poly bd Resin ® R 45 HT (Arco Chem. Co) or Nisso PB Resin ® G 2000 (Nippon Soda Co.).

Suitable polyether polyols are derived from alkoxylation products of water, ammonia, amines and mono to tetrahydric alcohols, for example ethylene glycol, 1,3-propane diol, neopentyl glycol, 1,4-butane diol, 1,6-hexane diol, 1,10-decane diol, glycerol, trimethylol propane, pentaerythritol, 4,4'-dihydroxydicyclohexyl-2,2-propane or bisphenol-A, with 1,2-alkylene oxides, such as ethylene oxide or propylene oxide or mixtures thereof. Polyethers produced from cyclic ethers, such a tetrahydrofuran or copolymers thereof with 1,2-alkylene oxides, are also suitable.

Suitable polyesters polyols are produced from known polyols, particularly from those mentioned above, and at least one polycarboxylic acid or anydrides thereof, particularly dicarboxylic acids such as succinic acid, glutaric acid, adipic acid, sebacic acid, phthalic acid, isophthalic acid, terephthalic acid, hexahydrophthalic acid, tetrahydrophthalic acid, endomethylene tetrahydrophthalic acid or methylhexahydrophthalic acids, and optionally from hydroxy carboxylic acids or their lactones.

Polyether and polyester polyols are particularly suitable by virtue of their particularly high compatibility with polyamides. Polyester polyols have the additional advantage of relatively high thermal stability.

Particularly suitable polyepoxide compounds are polyglycidyl ethers of polyhydric phenols, for example those of bisphenol-A, also glycidol ethers of polyhydric alcohols, preferably diols, for example 1,4-butane diol.

Glycidyl esters of polybasic aromatic, preferably $C_8$–$C_{19}$, aliphatic, preferably $C_4$–$C_{18}$ and cycloaliphatic, preferably $C_8$–$C_{19}$, polycarboxylic acids, preferably dicarboxylic acids, for example phthalic acid, hexahydrophthalic acid and adipic acid diglycidol ester, are also suitable.

The epoxides mentioned above may also be preextended by reaction with aliphatic or aromatic dicarboxylic acids, dimercaptans, hydrogen sulfide, ammonia or amines. Other suitable polyepoxides are polymers of glycidyl methacrylate or glycidyl acrylate, particularly copolymers with monounsaturated monomers, such as styrene, acrylonitrile, methylmethacrylate or methylacrylate.

Preferred polyepoxides are copolymers of glycidyl methacrylate and methylmethacrylate and/or styrene and also bis-glycidyl ethers of bisphenol-A.

Suitable polyanhydrides are cyclic anhydrides, optionally unsaturated aliphatic or aromatic polycarboxylic acid anhydrides ($C_8$–$C_{200}$), preferably of dicarboxylic acids. Particularly suitable anhydrides are those derived from optionally substituted maleic acid anhydride, namely 1. adducts of maleic acid anhydride to polybutadiene oils having molecular weights Mw of from 200 to 4000 and
2. copolymers of maleic acid anhydride with d,B-unsaturated monomers, such as styrene, ethylene, (meth)acrylic esters, acrylonitrile having melting points below 300° C. and mol weights Mw of up to more than 100.000.

Polyanhydride compounds having a funcationality of at least 5, are preferred and can be easily obtained by (co)polymerizing maleic acid anyhydride or glycidyl methacrylate. These compounds are particularly preferred because they also enable mouldings having excellent surface qualities to be obtained.

Polyamides in the context of the invention may be linear polycondensates of lactams containing at least 5 carbon atoms in the ring and standard polycondensates of diamines and dicarboxylic acids, such as 6,6-, 6,7-, 6,8-, 6,9-, 6,10, 6,12-, 8,8- and 12,12-polyamide, or polycondensates of aromatic dicarboxylic acids, such as isophthalic, terephthalic acid, with diamines, such as hexamethylene diamines, octamethylene diamine, of araliphatic starting materials, such as m-, or p-xylylene diamines and adipic acid, suberic acid, sebacic acid, and polycondensates based on alicyclic starting materials, such as cyclohexane dicarboxylic acid, cyclohexane diacetic acid, diaminodicyclohexylmethanes, isophorone diamine.

Mixtures of the above-mentioned polyamides or copolyamides obtainable from the above-mentioned units may also be used.

Partly crystalline polyamides are preferably used.

The polyamides used should have a relative viscosity of at least 1.8 (as measured on a 1% solution in m-cresol at 25° C.).

It is particularly preferred to use the 6-, 6,6-, 6,9-, 6,10-, 6,12-, 11- and 12-polyamides normally used for commercial injection mouldings and also copolyamides which are largely based on the above-mentioned polyamides and which have a relative viscosity of from 1.8 to 5.0 and preferably from 2.0 to 3.5, measured as described above.

Instead of using polyamides, it is also possible to use polymer blends, most of which—preferably at least 70% by weight—consist of polyamides and of which the blending component may be any elasticizing polymer known in principle, for example polyolefins, olefinic copolymers, preferably those containing polar groups, and also corresponding graft (co)polymers.

Products of this type are known, for example, from DAS No. 12 41 606 or DOS No. 27 58 568.

To produce the modified polyamides according to the invention, the polyamide and modifiers are mixed, preferably above the melding point of the polyamide. This may be done, for example, immediately after production of the polyamide, by mixing the modifiers with the melt to be spun off in the form of a strand. The modified polyamides according to the invention are preferably produced by mixing the components in standard scrwe extruders.

This procedure is adopted in particular in cases where, in addition to polyamides, other polymers are used for producing modified polymer blends or in cases where other additives, such as stabilizers, mould-release agents, lubricants, crystallization accelerators, plasticizers, pigments, dyes, strengtheners and/or fillers, such as glass fibers or asbestos, are incorporated.

Known standard machines are suitable for compounding; twin-screw extruders being preferred.

The moulding compositions according to the invention are distinguished by particularly good flow properties which may be regulated through the quantity and type of modifiers used. The modulus of flexure remains largely unaffected by the modification.

The modified polyamides according to the invention are particularly easily flowable products which may readily be processed into mouldings in standard injection-moulding machines. The mouldings obtained are distinguished by improved notched impact strength and, in addition, show the other outstanding good properties of polyamides.

Even without additional, standard additives, mouldings obtained from the polyamide moulding compositions according to the invention show better moulding-release characteristics than unmodified products and, in addition, they are distinguished by very good surface qualities.

The following modifiers are used in the Examples:

TYPE I

A: A polyester of dimeric fatty acid (Empol 1010 ®, a product of Unilever Emery) and hexane diol, OH number 56, acid number 1;

B: a polyester of adipic acid, ethylene glycol and 1,4-butane diol, acid number 0, OH number 56;

C: an ethane-diol-started polyether of propylene oxide and ethylene oxide, OH number 56;

D: polybutadiene oil R 45 HT$^{(R)}$, OH number 47.

TYPE II

E: A copolymer of 40% by weight of styrene, 40% by weight of methylmethacrylate and 20% by weight of glycidyl methacrylate ($M_w \sim 15{,}000$).

F: a copolymer of 50 mole percent of maleic acid anhydride and 50 mole percent of diisobutylene (average molecular weight $M_w \approx 20{,}000$).

G: a copolymer of 10% by weight of maleic acid anhydride and 90% by weight of styrene (average molecular weight $M_w \approx 100{,}000$).

H: bisphenol-A-bis-glycidol ether (Lekutherm X 20$^{(R)}$).

Production of the Modified Polyamides

EXAMPLE 1

96.7 parts by weight of a 6-polyamide having a relative viscosity of 2.9, as mesured on a 1% solution in m-cresol at 25° C., a notched impact strength of 2.3 kJ/m$^2$ as determined in accordance with DIN 53 453 and a flow length$^{(*)}$ of 55 cm, 3 parts by weight of polyester A and 0.3 part by weight of an epoxy resin E are separately delivered by means of a metering balance or metering pump to a type ZSK 53 twinscrew extruder and extruded at 260° C. (screw speed 90 r.p.m.). The homogeneous melt is spun off in strands form into a water bath, granulated and dried at 80° to 100° C. until it has a water content of less than 0.1% by weight.

The polyamide moulding composition has a relative viscosity of 2.8, measured as described above, a notched impact strength of 7.2 kJ/m$^2$ and a flow length of 58 cm$^{(*)}$.

(*) The flow length of a product is a mesaure of its fluidity and, hence, of its processibility. A relatively high flow length value signifies better fluidity and hence shorter injection cycles. Flow length is determined as follows: the sample to be studied is injected under a pressure of 72 bars into a special mould kept at 90° C. by means of an injection moulding machine having a barrel temperature of 260° C. Particularly free-flowing materials are capable of filling the mould under these conditions so that a 100 cm long spiral may be subsequently removed. Less fluid materials only partly fill the mould under the described conditions. In their case, it is only possible to obtain spirals less than 100 cm long on account of the premature solidification of the melt. The flow length is defined as the length in cm which is reproduced 5 times.

EXAMPLES 2 to 5

The mixtures were the same as in Example 1, except that the type and quantity of polyol used was varied. The results are set out in the following Table 1.

COMPARISON EXAMPLE 1

The unmodified polyamide of Example 1 was extruded without additives.

COMPARISON EXAMPLE 2

Caprolactam is produced by polycondensation in an autoclave using 1.2% by weight of acetic acid as chain terminator. The product is free flowing but lacks toughnes.

COMPARISON EXAMPLE 3

The relative viscosity of a polyamide-6 is increased to 4.2 and its notched impact strength improved by postcondensation in the solid phase. At the same time, however, fluidity is reduced. The properties are shown in the following Table 1.

COMPARISON EXAMPLE 4

Polyamide-6 of Example 1 was extruded in the same way as described before, except that only one of the two necessary modifiers was incorporated. Toughness is only slightly increased and fluidity reduced.

TABLE 1

| Example No. | Modifier I type | Modifier I % by weight | Modifier II type | Modifier II % by weight | Notched impact strength (kj/m$^2$) | Flow length (cm) |
|---|---|---|---|---|---|---|
| 1 | A | 3 | E | 0.8 | 7.2 | 58 |
| 2 | B | 3 | E | 0.8 | 6.4 | 55 |
| 3 | D | 6 | E | 0.8 | 9.5 | 93 |
| 4 | C | 3 | E | 0.8 | 5.4 | 57 |
| 5 | C | 6 | E | 0.8 | 11.3 | 63 |
| Comp. | | | | | | |
| 1 | — | — | — | — | 2.3 | 55 |
| 2 | — | — | — | — | 0.9 | 100 |
| 3 | — | — | — | — | 4.5 | 30 |
| 4 | C | 3 | — | — | 8.4 | 58 |

EXAMPLES 6 to 10

The tests were carried out in the same way as described in Example 1. The following Table 2 shows the effectiveness of the various polyanhydrides and epoxides.

EXAMPLE 11

Pa-6,6 ($\eta_{rel}$2.8, as measured on a 1% solution in m-cresol at 25° C.) was compounded as described in Example 1 with 6% by weight of modifier C and 0.5% by weightof modifier E.

| Polyamide | Unmodified | Modified |
|---|---|---|
| $a_k$ (kJ/m$^2$) | 1.8 | 4.6 |
| flow length (cm) | 68 | 74 |

EXAMPLE 12

A polyamide of isopthalic acid and hexamethylene diamine ($\eta_{rel}$2.4, as measured on a 1% solution in m-cresol at 25° C.) was compounded as in Example 1 with 6% by weight of modifier B and 0.5% by weight of modifier G.

| Polyamide | Unmodified | Modified |
|---|---|---|
| $a_k$ (kJ/m$^2$) | 8.1 | 5.0 |
| flow length (cm) | 25 | 25 |

TABLE 2

| Example No. | Modifier I type | Modifier I % by weight | Modifier II type | Modifier II % by weight | Notched impact strength (kj/m$^2$) | Flow length (cm) |
|---|---|---|---|---|---|---|
| 6 | C | 3 | F | 0.8 | 6.7 | 60 |
| 7 | C | 3 | G | 0.5 | 7.1 | 55 |
| 8 | C | 6 | H | 0.8 | 8.2 | 68 |
| 9 | C | 3 | G | 0.5 | 7.1 | 55 |
| 10 | C | 6 | G | 0.5 | 10.9 | 58 |

We claim:

1. A thermoplastic polyamide molding composition produced from a mixture consisting essentially of:
   (a) 70 to 98.95%, by weight, of a thermoplastic polyamide;
   (b) 1 to 30%, by weight, of a long-chain polyester-, polyether-or hydrocarbon-polyol having a number average molecular weight of from 500 to 2,500, a softening point of 100° C. or less and a functionality of 4 or less; and (c) 0.5 to 5%, by weight, of at least one polyanydride selected from an adduct of maleic acid anydride with a polybutadiene oil; or a compolymer of maleic acid anhydride with styrene, ethylene, (meth-)acrylic ester or acrylonitrile, having a functionality of at least five, a polyepoxide or mixtures thereof;

the sum total of components a) to c) being 100%, by weight.

2. A polyamide molding composition as claimed in claim 1, produced from
   85 to 97.9%, by weight, of component (a);
   2 to 15%, by weight, of component (b);and
   0.1 to 3%, by weight, of component (c).

3. A polyamide molding composition as claimed in claim 2, produced from 92 to 96%, by weight, of component (a).

4. A polyamide molding composition as claimed in claim 2 or 3, produced from 3 to 8%, by weight, of component (b).

5. A polyamide molding composition as claimed in claim 1, wherein component (b) is
   a telechelic, hydrogenated polybutadiene or polyisoprene polyol;
   a polyether polyol derived from an alkoxylation product of water, ammonia, amine and a mono to tetrahydric alcohol, cyclic ethers or phenol with a 1,2-alkylene oxide or mixtures thereof, or
   a polyester polyol produced from a polyol and a dicarboxylic acid.

6. A polyamide molding composition as claimed in claim 1, wherein component (b) has a number average molecular weight of from 1,500 to 2,500 and a functionality of two.

7. A thermoplastic polyamide molding composition produced from a mixture consisting essentially of:
   (a) 70 to 98.95%, by weight, of a thermoplastic polyamide;
   (b) 1 to 30%, by weight, of a long-chain polyester-, polyether-or hydrocarbon-polyol having a number average molecular weight of from 500 to 2,500, a softening point of 100° C. or less and a functionality of 4 or less; and
   (c) 0.5 to 5%, by weight, of a polyglycidyl ether of a polyhydric phenol, or a polyhydric alcohol; a polyglycidyl ester of a polybasic aromatic, aliphatic or cycloaliphatic polycarboxylic acid; or a polymer of glycidyl acrylate or glycidyl methacrylate or a copolymer of glycidyl acrylate or glycidyl methacrylate with an unsaturated monomer;
   the sum total of components (a) to (c) being 100%, by weight.

8. A polyamide molding composition as claimed in claim 7, wherein component (c) is
   a polyepoxide selected from a polyglycidyl ether of 1,4-butane diol, a polyglycidyl ester of phthalic acid, hexahydrophthalic acid or adipic acid; a copolymerizate of glycidyl (meth)acrylate with styrene, acrylonitrile, methyl-methacrylate or methyl-acrylate.

* * * * *